US008721869B2

(12) United States Patent
Blum

(10) Patent No.: US 8,721,869 B2
(45) Date of Patent: May 13, 2014

(54) MOVING ELECTRODE ELECTROFLOCCULATION PROCESS

(76) Inventor: Holger Blum, Teufen (CH)

( * ) Notice: Subject to any disclaimer, the term of this patent is extended or adjusted under 35 U.S.C. 154(b) by 817 days.

(21) Appl. No.: 12/303,271

(22) PCT Filed: Jun. 6, 2006

(86) PCT No.: PCT/EP2006/005384
§ 371 (c)(1),
(2), (4) Date: Sep. 16, 2010

(87) PCT Pub. No.: WO2007/140802
PCT Pub. Date: Dec. 13, 2007

(65) Prior Publication Data
US 2010/0326841 A1 Dec. 30, 2010

(51) Int. Cl.
*C02F 1/463* (2006.01)
*C02F 1/465* (2006.01)
*C02F 1/461* (2006.01)

(52) U.S. Cl.
CPC .............. *C02F 1/46114* (2013.01); *C02F 1/463* (2013.01); *C02F 2001/46123* (2013.01); *C02F 2001/46161* (2013.01); *C02F 2201/4619* (2013.01)
USPC ........... 205/757; 204/273; 204/276; 204/277; 205/754

(58) Field of Classification Search
CPC ................. C02F 1/46114; C02F 1/463; C02F 2001/46123; C02F 2201/4619
USPC ......... 204/273, 276, 277, 287, 288.2, 297.01; 205/742, 754, 755, 757, 758
See application file for complete search history.

(56) References Cited

U.S. PATENT DOCUMENTS 3,081,877 A * 3/1963 Jakobs et al. ................. 210/293
3,421,999 A * 1/1969 Corwin ......................... 210/192
(Continued)

FOREIGN PATENT DOCUMENTS

DE          3641365 A1    8/1988
WO    WO-95/15295 A1    11/1994

OTHER PUBLICATIONS

Michael J. Matteson et al., Electrocoagulation and separation of aqueous suspensions of ultrafine particles, Colloids and Surfaces, A: Physicochemical and Enginerring Aspects 104 (1995) 101-109.

(Continued)

*Primary Examiner* — Keith Hendricks
*Assistant Examiner* — Steven A. Friday
(74) *Attorney, Agent, or Firm* — Nawrocki, Rooney & Sivertson, P.A.

(57) ABSTRACT

The present invention provides a high volume, foul-resistant electrolytic process for treating contaminated water comprising at least one upflow electroflocculation cell consisting of (i) a lower (or "bottom") electrode (3) in form of a porous, non-fluidized bed of loose iron or aluminium granules kept in periodic motion by pulsed gas injections and (ii) an upper (or "top") vibrating electrode (4) made of an iron or aluminium grid mesh or ribmesh. A voltage potential between the upper (4) and lower (3) electrode causes ions to be released from the moving electrodes. These ions oxydise and/or render insoluble contaminants in the ascending flow of wastewater and create easy filterable insoluble contaminants resulting in substantially cleansed water. Such moving electrodes electroflocculation cells are useful at municipal water works and commercial and industrial applications were large amounts of raw water have to be processed.

14 Claims, 1 Drawing Sheet

(56) References Cited

U.S. PATENT DOCUMENTS

| | | | |
|---|---|---|---|
| 3,498,462 A | * | 3/1970 | Larrowe et al. ............... 210/289 |
| 3,846,300 A | | 11/1974 | Inoue |
| 3,871,989 A | * | 3/1975 | King ............................ 204/272 |
| 4,149,953 A | | 4/1979 | Rojo |
| 4,176,038 A | * | 11/1979 | Moeglich ...................... 204/277 |
| 4,351,734 A | * | 9/1982 | Kauffman ................ 210/748.19 |
| 5,124,017 A | | 6/1992 | Rogov et al. |
| 5,766,430 A | * | 6/1998 | Mehler ................... 204/297.11 |
| 6,179,991 B1 | | 1/2001 | Norris et al. |
| 6,663,766 B1 | | 12/2003 | Adin et al. |
| 2003/0205535 A1 | | 11/2003 | Roth |

OTHER PUBLICATIONS

Eilen A. Vik et al., Electrocoagulation of Portable Water; Water Research, vol. 18, No. 11. pp. 1355-1360, 1984.

Y A Xiong et al., Treatment of Dye Wastewater Containing Acid Orange II Using Cell With Three-Phase Three-Dimensional Electrode, Water Research, vol. 35, No. 17, pp. 4226-4230, 2001.

* cited by examiner

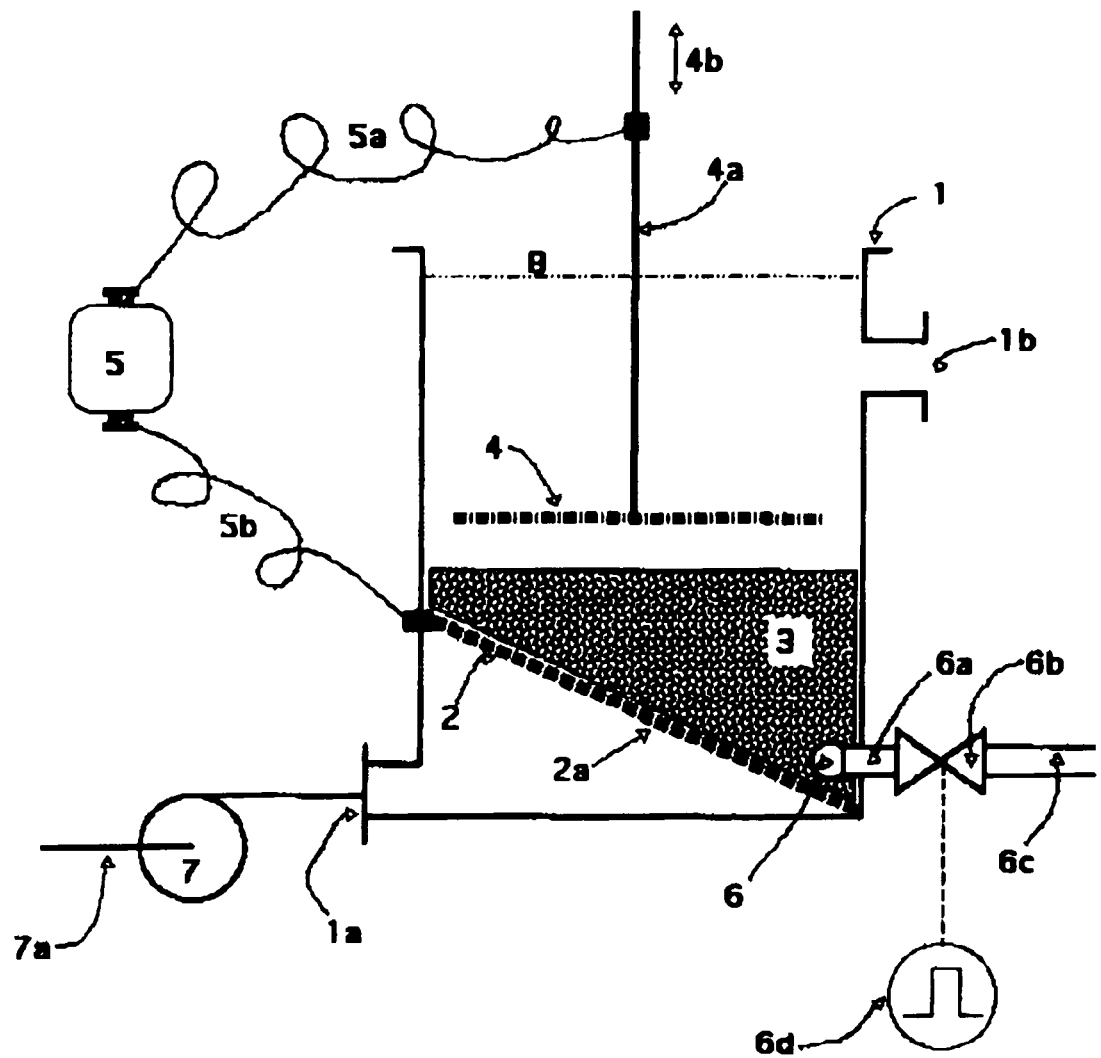

MOVING ELECTRODE ELECTROFLOCCULATION PROCESS

REFERENCES CITED

German Patent DE 3641 365 (1988) Klose; G.
European Patent EP 6682 44 (1994) Batt; S.
PCT/WO. 95/15295 (1995) Beaujean; H.
U.S. Pat. No. 6,179,991 (2001) Norris; B.
U.S. Pat. No. 6,663,766 (2003) Adin; A.

OTHER REFERENCES

Matteson, Michael J., Dobson, Regina L. et al., Electrocoagulation and separation of aqueous suspensions of ultrafine particles, *Colloids and Surfaces A: Physicochemical and Engineering Aspects,* 104; 1 (November): 101-109 (1995).

Vik, E A, Carlson, D A, Eikun, A S and Gjessing, E T, Electrocoagulation of potable water, *Water Research,* 18; 11: 1355-1360 (1984).

FIELD OF THE INVENTION

This invention relates to water treatment and relates particularly, though not exclusively, to treating polluted water using electroflocculation and/or electrocoagulation reactions.

BACKGROUND OF THE INVENTION

Electroflocculation cells have been described in the prior art (see for example German Patent DE 3,641,365 to Klose, U.S. Pat. No. 6,179,991 to Norris, U.S. Pat. No. 6,663,766 to Adin, European Patent EP 6682 44 to Batt; and PCT International Application PCT/WO. 95/15295 to Beaujean).

The publication by Matteson, Michael J., Dobson, Regina L. et al "Electrocoagulation and separation of aqueous suspensions of ultrafine particles", *Colloids and Surfaces A: Physicochemical and Engineering Aspects,* 104; 1 (November): 101-109 (1995), and the publication by Vik, E A, Carlson, D A, Eikun, A S and Gjessing, E T, "Electrocoagulation of potable water", *Water Research,* 18; 11: 1355-1360 (1984) describe electroflocculation cells or electroflocculation systems.

A disadvantage of the prior art electroflocculation cells is tendency to foul. Solutes present in many ambient waters, such as Calcium Sulfate or Calcium Carbonate or other solutes, are present at or near saturation. Such solutes have a tendency to form scales and foul the equipment. Commonly present suspended hydrocarbons, turbidity, colloids, and particles may also form strongly adherend deposits and oil films on the cell electrodes, thereby causing local pitting resulting in low current efficiency.

Klose, German Patent DE 3641 365 describes an apparatus in which electroflocculation takes place by serpention flow of contaminated water through a bed of vertical positioned electrodes of alternating iron and aluminium sheet metal. Practical examination shows that this configuration has a low volume capacitiy and shows a strong tendency to form nonconducting deposits on the electrodes resulting in low current efficiency.

A similar apparatus in form of a stack of horizontal electrodes made of perforated iron and aluminium metal sheet has been submitted by Adin, U.S. Pat. No. 6,663,766. This electroflocculation cell has local stagnant areas prone to fouling and requires costly machining of the electrode stack.

A vertical and parallel array of aluminium and/or iron electrodes plus a stream of compressed air alongside these electrodes has been proposed by Beaujean PCT/WO. 95/15295. This stream of compressed diminishes fouling of the apparatus, however examination in practice reveals that the current efficiency of this design is poor.

A high volume column type electroflocculation cell has been disclosed by Batt European Patent EP 6682 44. This design however requires one of the electrodes to be of the composite type, something that turns out to be more costly than the use simple electrodes. Moreover, composite electrodes tend to be unstable due to the different dissolution rates of aluminium and iron.

Norris, U.S. Pat. No. 6,179,991 proposes a machine for treating contaminated water comprising a chamber with at least two electrodes having voltages of different polarities and made of multivalent metals and one or more scraper blades in substantial contact with said electrodes wherein said blades are capable of movement along the length of said electrodes to remove accumulated debris. Despite that the problem has been correctly recognized no practical realization is possible because the electrodes thin out. Since an additional cleaning mechanism is necessary this proposal becomes very costly.

There is therefore a significant and unfulfilled need for a new and improved flow-through electroflocculation apparatus, method and system. Such an electroflocculation cell would be resistant to fouling and have high current efficiency. It would furthermore be desirable for such an electroflocculation cell to be easy to manufacture, and not require any unnecessary parts that increase cost, or limit the usefulness of the electroflocculation cell.

SUMMARY OF THE INVENTION

This invention is directed to an electroflocculation cell that meet this need. The cell comprises two electrodes, a "top" and a "bottom" electrode having voltages of different polarities and made of iron and/or aluminium which form multivalent salts. Said electrodes are in constant or periodic movement thereby minimizing the build-up of organic or inorganic deposits.

The lower (or "bottom") electrode consists of a non-fluidized porous bed of loose iron and/or aluminium granules, kept in periodic motion by pulsed gas injections. This porous bed electrode rests on a tilted conductive support said conductive support being connected to a electric current source.

The upper (or "top") vibrating electrode is made of an iron/and or aluminium grid mesh or ribmesh. Said top electrode is connected to a electric current source of opposite polarity with regard to the bottom electrode and said top electrode is held in constant motion by means of a mechanical vibrator.

a) Water containing contaminants susceptible to flocculation and precipitation upon electrolysis of the water is pumped upwards first through the porous bottom electrode and thereafter the water contacts the top electrode.

(b) by energizing the top and bottom electrodes with direct current, the electrolyzed water forms a sedimentable flocculate therein. Suspended solids able to flocculate in this cell include bacteria, parasites, algae, paint and other pigments, carbon black, asbestos fibres, industrial grit, clay and similar.

The insoluble contaminants are separated from the substantially cleansed water by known methods such as mechanical filtering or by centrifuging.

Another object of the invention is the system and process to treat waste streams that are both complex and with variable contaminate compositions.

This new, state-of-the-art, technique is simple. It does not require expensive electrodes, nor does it use sophisticated equipment. Energy requirement is also minimal for there is a higher current efficiency. Another object of the present invention is to provide a high volume, foul-resistant electroflocculation process which uses much less costly equipment. All the problems that are circumvented by this new method are clearly present in all prior disclosed methods of electroflocculation.

Further objects and advantages will become obvious by comparison of this simple, economical method described herein and conventional uneconomical methods.

These and other objects of the present invention will become apparent to those familiar with various types of processes and systems for electrolytic, electroflocculation or electrocoagulation treatment of high volumes of contaminated water when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

It is to be understood that both the foregoing general description and the following detailed description are exemplary, and are intended to provide further explanation of the invention as claimed.

BRIEF DESCRIPTION OF THE DRAWING

FIG. 1 illustrates a flow diagram and the individual components making up the subject high volume electroflocculation cell for treating and cleaning contaminated water streams.

DETAILED DESCRIPTION OF THE INVENTION

It is to be understood, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Turning now to FIG. 1, an electroflocculation cell according to my invention is schematically illustrated.

The electroflocculation cell comprises a generally rectangular casing (1) composed preferably of a suitable non-conductive material. The cell casing (1) can however be of any material or design that will contain aqueous solutions and of any geometric shape that will allow contaminated water upflow between charged electrodes, as discussed hereinafter. The material should be chemically inert or corrosion-resistant, preferably non-conductive, although the casing may be composed of metal if proper insulation is applied. The casing (1) has an inlet supply pipe (1a) at its bottom and a treated water outlet (1b) at its top in order to discharge the treated medium. The aqueous medium is flowed through the casing as illustrated at FIG. 1, by means of a suitable pump (7) for treatment, as described hereinafter, and discharged to a suitabe vessel, tank or other electroflocculation cell of the same type. The pump (7) may be operable at either a fixed rate or selectable variable rate. Suction line (7a) may be connected either to a water reservoir to be treated or to another electroflocculation cell.

It should be understood that more than on cell may be connected in parallel or series.

With reference to FIG. 1, the electroflocculation cell comprises a pair of electrodes (3) and (4). Each electrode is separately connected to a source of electric current (5) by means of electrical feeder cables (5a) and (5b). At least one of the electrodes is isolated within the casing (1).

The electrode (3) consists of a porous, non-fluidized bed of loose iron and/or aluminium granules kept in periodic motion by pulsed gas injections.

The electrode (3) is supported by a conducting, tilted support plate (2) which has a suitable number of nozzle inlets (2a), for flowing aqueous medium through the cell. Preferably the support plate (2) has a tilting angle of more than about 5 degrees and less than about 65 degrees. The nozzle inlets (2a) preverably have an inner diameter smaller than that of the average diameter of the metal granules of bed electrode (3). The tilted support plate is preverably made from iron or aluminium and is connected to the electrical torrent source via feeder cable (5b).

As water is pumped upward from inlet pipe (1a) into the bottom part of the casing (1) and through nozzle inlets (2a), the water enters the porous bed of metal granules (3). The metal is preferably aluminium or iron. It is preferred that the average particle size of the metal granules be at least about 1 mm in size and range up to about 6 mm. The volume of the electrode bed (3) should be that volume which will assure electro-chemical activity of the bed to pass current. The flow capacity of the feed pump (7) must be regulated so that the electrode bed (3) does not expand or gets fluidized under the action of the water flow for this would dramatically lower the current efficiency of the cell.

With reference to FIG. 1, a few centimeters situated parallel and above the bottom electrode (3), the second and top electrode (4) is situated. Electrode (4) is made of commercial iron or aluminium grid mesh or ribmesh and is held in position by metal rod (4a) (only one shown).

Metal rods (4a) are connected to mechanical vibrators (not shown in the drawing), which causes the vibration (4b) of electrode (4). The amplitude of these vibrations (4b) of the electrode ( ) 4 is about 0.1 mm to about 1 o mm and the frequency of this vibration is preferably between about 0.1 to 100 per second.

Near the bottom of the casing (1) and embedded in granule bed (3) is positioned gas injection tube (6), which features a number of small holes (not shown) so that gas-pulses can be injected into the lower part of electrode bed (3). These gas pulses have a pulse-duration of between about 0.2 to about 2 seconds and cause a mixing action in the whole electrode bed (3). This mixing action is very slow and enhanced by the tilt of the support plate (2). The completion of one total mixing takes two to three days. According to my experiments the gas injections cause the electrode bed (3) to be in slow motion. By this slow mixing movement, fresh granules are constantly supplied to the water boundary facing the electrode (4), resulting in an outstanding current efficiency of my electroflocculation cell design.

With reference again to FIG. 1, the aforesaid gas injection tube (6) is connected via pipe (6a) to magnet-operated valve (6b) and to pressure gas pipe (6c). Air or Nitrogen are the preferred gases to be injected into electrode bed (3), the preferred gas pressure being between about 4 to 40 bars. Electronic controller (6d) sends pulses of about 0.2 to about 2 seconds duration to magnet-operated valve (6b). In order to achieve the slow movement of the electrode bed 3 about 5 to 50 gas injections have to be performed per each operating hour of the electroflocculation cell.

In use, water containing contaminants such as bacteria, heavy metals, oils, grease, hydrocarbons, volatile organic compounds, metals and cyanide complexes enters into the inlet (7a) of the pump (7) and flows into casing (1) via inlet (1a) and exits via the outlet (1b). The influent water source may be a holding tank, sump, pit, pond, lagoon and the like. At the same time, a voltage is applied between the electrodes (3) and (4). While a wide range of voltages may be used, a voltage in the range of from about 10 volts to about 30 volts has been found to be necessary to effect the flocculation of all wastewater contaminants. Operating the voltage in this range produces mean electrode current densities of from 2-9 milliampere/sq. cm and localized, point current densities as high as from 8-80 milliampere/sq. cm, sufficient to partially oxidize the oils, greases, hydrocarbons, volatile organic compounds and other organics in the wastewater by opening double bonds and thereby changing the polarity of the contaminants making them more compatible with the polar chemical flocculating agents. The electrical operating conditions at the electrodes (3) and (4) effect the oxidation of volatile organic compounds quantitatively as well as other organics to a significant degree.

Operating the voltage at a range from 15 to 20 volts also promotes the oxidation of the electrodes to form metal-hydroxides. The enhancement of aluminium and/or iron hydroxide formation is a result of the effect of the high voltage operation on the surface of the electrodes.

Gas bubbles created by the electrolytic action lift the greater parts of the coagulated solids to the air-water interface of the electroflocculation cell, creating floating sludge (8) which can be easily collected by mechanical means. Both electrodes slowly sacrifice themselves but, due to their easy and low cost availability and the absence of any dismantling process, with this electroflocculation design the present invention will operate hundred of hours before any maintenance is required.

EXAMPLE I

An electroflocculation cell according FIG. 1 contained as electrode (3) aluminium granules (pellets) of 2-3 mm diameter. This bed of aluminium granules rested on a 5 mm aluminium metal plate as the support (2). The metal plate (2) had various 1 mm diameter openings (2a). The tilting angle of the support (2) was 20 degrees. At the thickest part of the granule bed (3) and attached to the support plate (2) a gas injection tube (6) of 25 mm outer diameter was positioned. This gas injection tube was equipped with a number of tiny openings to permit passage of the gas directed into the granule bed (3). The medium depth of the granule bed was 40 cm.

Directly above the granule bed electrode (3) an aluminium gridmesh electrode (4) as a 4 mm strong perforated metal plate had been attached via metal rods (4a) to a mechanical vibrator.

The perforations represented 45% of the metal plate (4).

Measured submerged, the average vibration amplitude of the gridmesh electrode (4) was 1 mm. Vibration frequency was 50 Hz.

The distance between electrode (3) and (4) was 3 centimeters.

Turbid water from a pond which, after test-filtration across a coarse sand filter still containing nonfilterable remnants of suspended clay solids (TSS) of 800-1000 milligrams/liter, was directed into the electroflocculation cell.

The capacity of pump (7) was maintained at 30% of a flow rate which would have caused the granule bed (3) to fluidize.

The electrodes (3) and (4) received a constant supply of 250 amperes/m3-flow/hour.

Every 2 minutes the magnet-valve (6b) attached to the 16 bar air pressure line (6c) openend for one second, and with help of the pressure gas pulse slowly mixed the aluminum granules of electrode (3).

After 30 hours of use constant operating conditions were achieved. And now the flocculated effluent from the cell after filtration over a coarse sand filter showed a TSS of only 2 bis 6 milligrams/Liter.

EXAMPLE II

An electroflocculation cell according FIG. 1 contained as electrode (3) iron granules of 1-3 mm diameter. This bed of granules rested on a 6 mm steel plate as the support (2). The steel plate (2) had various plastic nozzles with 0.7 mm openings (2a). The tilting angle of the support (2) was 28 degrees. At the thickest part of the granule bed and attached to the support plate (2) a gas injection tube (6) of 20 mm outer diameter was positioned. This gas injection tube was equipped with a number of tiny openings to permit passage of the gas directed into the granule bed (3). The medium depth of the granule bed was 60 centimeters.

Directly above the granule bed electrode (3) an rib mesh electrode (4) made from 8 mm diameter steel wire had been attached via metal rods (4a) to a mechanical vibrator.

The perforations represented 85% of the electrode area (4).

Measured submerged, the average vibration amplitude of the rib mesh electrode (4) was 2 mm. Vibration frequency was 50 Hz.

The distance between electrode (3) and (4) was 4 centimeters.

Turbid water from a pond which, after test-filtration across a coarse sand filter still containing nonfilterable remnants of suspended clay solids (TSS) of 800-1000 milligrams/liter, was directed into the electroflocculation cell.

The capacity of pump (7) was maintained at 20% of a flow rate which would have caused the granule bed (3) to fluidize.

The electrodes (3) and (4) received a constant supply of 200 amperes/m3-flow/hour.

Every 3 minutes the magnet-valve (6b) attached to the 25 bar nitrogen pressure line (6c) openend for one second, and with help of the pressure gas pulse slowly mixed the iron granules of electrode (3).

After 38 hours of use constant operating conditions were achieved. And now the flocculated effluent from the cell after filtration over a coarse sand filter showed a TSS of only 0.5 to 1 milligrams/Liter.

While the invention has been described above with references to specific embodiments thereof, it is apparent that many changes, modifications and variations in the material, arrangements of parts and steps can be made without departing from the inventive concept disclosed herein. Accordingly, the spirit and broad scope of the appended claims is intended to embrace all such changes, modifications and variations that may occur to one of skill in the art upon a reading of the disclosure. All patent applications, patents and other publications cited herein are incorporated by reference in their entirety.

I claim:

1. A high volume, foul-resistant electrolytic process for treating contaminated water in an electroflocculation cell which comprises a bottom electrode and a top electrode connectable to an electrical current source and immersed in a water stream, the process comprising:
   a. feeding the contaminated water to the electroflocculation cell below the bottom electrode;
   b. passing the contaminated water upwards, first through the bottom electrode comprising a porous, non-fluidized bed of loose metal granules resting on a tilted conducting support plate having nozzle inlets;
   c. embedding a perforated gas injection tube featuring number of holes within the bottom electrode and attaching it to and above the tilted conducting support plate at a location where the bed of loose metal granules has a depth maximum;
   d. keeping the loose metal granules of the porous, non-fluidized bed in periodic motion via pulsed gas injections from the perforated gas injection tube directly into the non-fluidized bed whereby a mixing action by the pulsed injections at said location enhanced by the tilt of the tilted conducting support plate is provided;
   e. further passing the contaminated water stream upwards, contacting thereby the top electrode comprised of a metal mesh;
   f. mechanically vibrating the top electrode; and,
   g. applying electric power to the bottom and top electrodes during the treatment process.

2. The process of claim 1 wherein said electrodes are connected to an AC power source.

3. The process of claim 1 wherein said electrodes are connected to a DC power source.

4. The process of claim 1 wherein said loose metal granules are made of iron or aluminum.

5. The process of claim 1 wherein the tilted conducting support plate is made of iron and/or aluminum.

6. The process of claim 1 wherein a tilt angle of the tilted support plate is adjustable within a range of about 10 to 60 degrees with respect to horizontal.

7. The process of claim 1 wherein a facing surface area of the top electrode is closely spaced from the bed of loose metal granules.

8. The process of claim 1 further comprising removing agglomerated contaminants from the contaminated water after treated water has flowed out of the electroflocculation cell.

9. An electroflocculation cell for the high volume, foul-resistant electrolytic process for treating contaminated water comprising a bottom electrode and a top electrode connected to an electrical current source, wherein the cell is configured to contain a contaminated water stream flowing upwards first through the bottom electrode and then flowing further upwards to contact the top electrode, wherein the bottom electrode is provided in the form of a porous, non-fluidized bed of loose metal granules resting on a tilted conducting support plate having a number of nozzle inlets; wherein the top electrode is adapted to be mechanically vibrated;
   the cell further comprising a perforated gas injection tube featuring a number of holes, the perforated gas injection tube embedded within the bottom electrode and attached to and above the tilted conducting support plate at a location where the bed of loose metal granules has a depth maximum, wherein the perforated gas injection tube is adapted to feed pulsed gas injections from the perforated gas injection tube directly into the loose metal granules to keep the loose metal granules in periodic motion.

10. The electroflocculation cell according to claim 9 wherein said loose metal granules are made of iron or aluminum.

11. The electroflocculation cell according to claim 9 wherein the tilted support plate has is made of iron and/or aluminum.

12. The electroflocculation cell according to claim 9 wherein a tilt angle of the tilted conducting support plate is within a range of about 10 to 60 degrees with respect to horizontal.

13. The electroflocculation cell according to claim 9 wherein the top electrode has a surface area closely spaced from the bed of loose metal granules.

14. The electroflocculation cell according to claim 9 wherein the cell comprises at least one modular casing having bottom, front, rear and sidewalls, and is characterized by an inlet for admitting water to be purified, and an outlet for water and agglomerated solids egress.

\* \* \* \* \*